May 10, 1949. J. M. CARTER 2,469,916
PROCESS OF PRODUCING URANIUM TETRABROMIDE
Filed Aug. 4, 1944
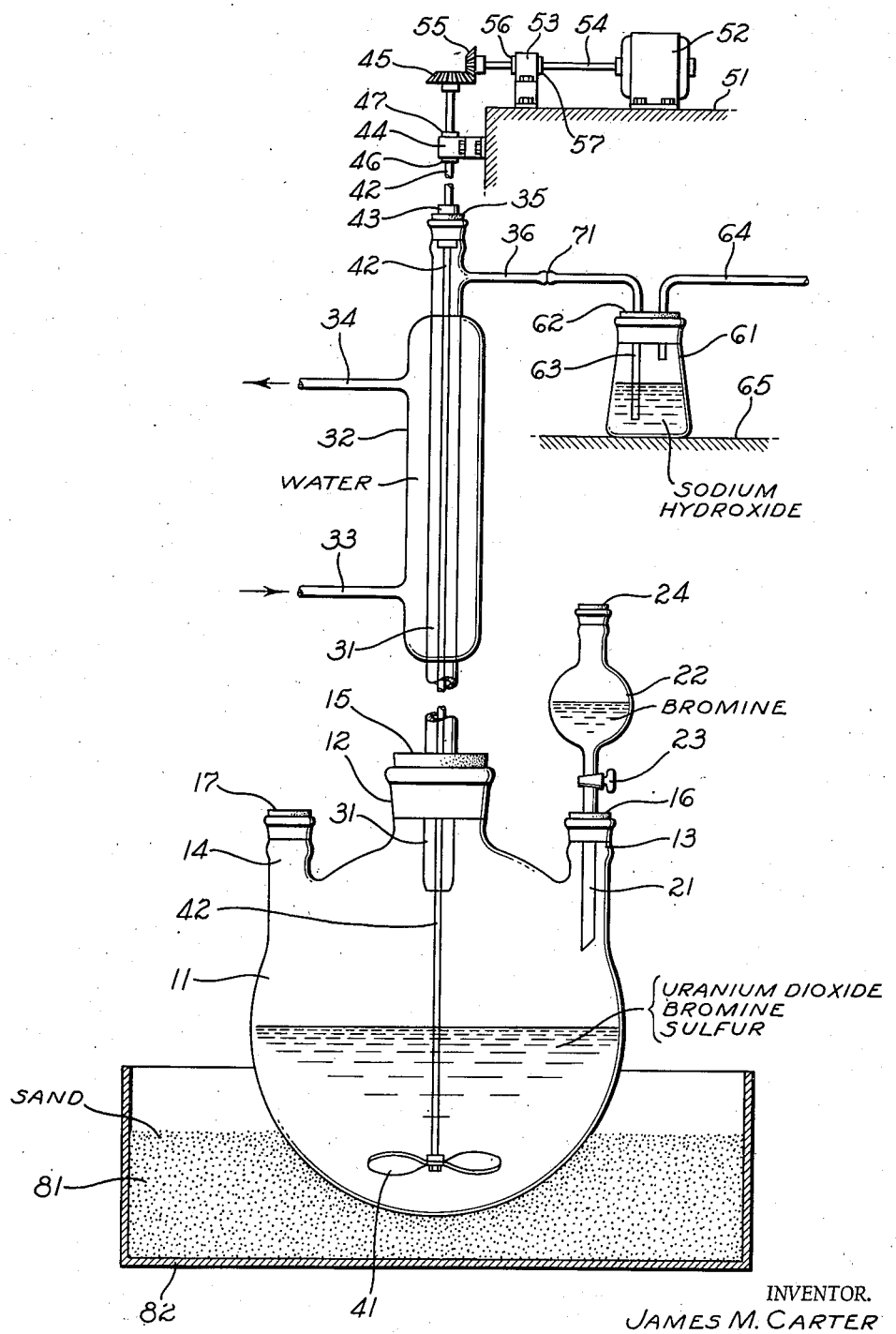
INVENTOR.
JAMES M. CARTER
BY
ATTORNEY.

Patented May 10, 1949

2,469,916

UNITED STATES PATENT OFFICE 2,469,916

PROCESS OF PRODUCING URANIUM TETRABROMIDE

James M. Carter, Pasadena, Calif., assignor to the United States of America as represented by the United States Atomic Energy Commission Application August 4, 1944, Serial No. 548,118

8 Claims. (Cl. 23—14.5)

This invention relates to the manufacture of uranium tetrabromide, especially its preparation by a moderate temperature liquid phase process. More particularly, it appertains to the preparation of uranium tetrabromide by a liquid phase reaction of a uranium oxide with sulfur bromide which, if desired, may be prepared in situ by heating the oxide with a mixture of bromine and sulfur. Still more particularly, it appertains to the preparation of uranium tetrabromide as aforesaid wherein uranium dioxide is employed as starting material.

Heretofore, uranium tetrabromide has been difficult to produce and it has not been available in the quantities requisite to large-scale commercial operations. Its preparation from uranous-uranic oxide ($U_3O_8$) and sulfur bromide requires high reaction temperatures under vapor phase conditions, excessive quantities of adjuvant bromine and difficult purification (Colani: Annales de Chemie et de Physique:8: 12, 59–144 at 74–75: 1907). Its preparation from uranium carbide ($UC_2$) and bromine is uneconomical because of the special electrical equipment required to produce the uranium carbide.

This invention has for an object the preparation of uranium tetrabromide by a simple, easy and economical operation. Other objects are to convert uranium oxides, and particularly the dioxide, to uranium tetrabromide; to produce uranium tetrabromide from uranium dioxide, sulfur and bromine; to react uranium dioxide with sulfur and bromine and/or sulfur bromide; to produce uranium tetrabromide at moderate temperatures; to manufacture uranium tetrabromide by a liquid phase reaction; to prepare uranium tetrabromide from a uranium oxide by a procedure which minimizes or eliminates side reactions; to devise a process for the preparation of uranium tetrabromide in which the reaction temperature is easily maintained in an optimum temperature range; and to reduce the time required to convert a uranium oxide to uranium tetrabromide. A general advance in the art and other objects which will appear hereinafter are also contemplated.

It has now been discovered that good yields of uranium tetrabromide are obtained by reacting a uranium oxide, such as the dioxide, and sulfur bromide under liquid phase conditions, and particularly by forming the reactive sulfur bromide in situ by agitating and refluxing a mixture of the uranium oxide, bromine and sulfur at an elevated temperature which is preferably about 170° C., but which may be considerably higher or lower if desired.

How the foregoing objects and related ends are accomplished will be apparent from the following exposition in which are disclosed the principle, the organization and divers embodiments of the invention, including the best mode contemplated for carrying out the same. Parts are given by weight throughout the written description, which is amplified by the accompanying drawing, the single figure being a diagrammatic side elevational view, partly in section, of an apparatus for carrying out the process of the invention.

The apparatus chosen for purposes of illustration comprises a reaction vessel equipped with stirring means and arrangements for heating. The vessel has charging ports and is fitted with a reflux condenser. The condenser is in turn connected to a trap containing material that will absorb the reactive vapors not condensed.

Referring now to the drawing, there is shown a reaction vessel 11 formed of glass and having a central port 12 and two side ports 13 and 14. The port 12 is closed by a plug 15, the port 13 is closed by a plug 16, and the port 14 is sealed with a stopper 17.

Extending through the plug 16 is a feeder tube 21 connected to a reservoir 22. This feeder tube incorporates a stopcock 23; and a loosely fitting stopper 24 is used to prevent the escape of obnoxious vapors from the reservoir 22.

Projecting through the plug 15 is a condenser tube 31. This tube is surrounded by a jacket 32 enclosing the space where the cooling medium or liquid comes in contact with the tube 31. This jacket has a cooling liquid inlet 33 and a cooling liquid outlet 34. The upper end of the condenser tube 31 is closed with a plug 35; and a laterally-extending tube 36 serves as an escape vent above the cooling portion of the condenser tube.

Agitation of the contents of the reaction vessel is obtained by means of a propeller-blade-type stirrer 41 mounted on a rod 42 journalled in a bearing 43 carried by the plug 35 and a bearing 44 bolted to a support 51. Thrust collars 46 and 47 disposed on opposite sides of the bearing 44 maintain the rod 42 at the desired vertical position. A bevel gear 45 keyed to the upper end of the rod 42, meshes with a similar gear 55 carried by a shaft 54 which is journaled in a bearing 53 and operated by a motor 52. The bearing 53 and the motor 52 are bolted to the support 51 and two thrust collars 56 and 57 assist in maintaining the shaft 54 in proper position. A trap 61 incorporating an adit tube 63 and an exit tube 64 is connected through a joint 71 to the tube 36, for the purpose of preventing the escape of undesirable vapors into the atmosphere surrounding the apparatus.

The reaction vessel 11 is heated by setting it in a pulverulent heat-transfer medium 81, such as sand, arranged in a receptacle 82 and applying heat to the receptacle.

In carrying out the process the apparatus is assembled as shown in the drawing, powdered sulfur and uranium dioxide are charged through the port 14 and bromine is admitted through the feeder tube 21 from the reservoir 22. Agitation of the resultant slurry reaction mass is obtained by operation of the motor 52; and the contents of the reaction vessel are heated by applying heat to the sand in the receptacle 82. While the reflux condenser is in operation, the vapors of bromine and sulfur bromide are largely condensed and returned to the reaction vessel. Any sulfur dioxide formed escapes through the tube 36 into the trap 61, where it is chemically combined with a quantity of sodium hydroxide contained therein. Upon completion of the reaction, the trap 61 is disconnected at the joint 71 and a suitable collection vessel is connected to the condenser in its place. The flow of cooling liquid through the condenser is stopped and the bromine and sulfur bromide are distilled over. Thereafter, the sulfur present in the reaction mass may be separated from the uranium tetrabromide by any suitable method. For example, a preferential solvent for the sulfur, such as carbon tetrachloride, may be employed to dissolve the sulfur, and the uranium tetrabromide then recovered by filtration. If desired, the uranium tetrabromide may be further purified, for example, by fractional sublimation, in order to separate it from any unreacted uranium dioxide or other impurities that may be present.

The invention will be further understood from a consideration of the following specific example.

*Example*

A charge consisting of 25 parts of uranium dioxide in finely divided form, 35 parts of bromine and 15 parts of sulfur was placed in a glass-lined reaction vessel. The slurry mass was agitated by a propeller type stirrer and heated. The temperature of the mass was gradually raised to 170° C. and maintained at that level during the course of the reaction. Refluxing conditions were maintained with a water-cooled condenser. A sample taken at the end of three hours heating showed 46% of the uranium dioxide has been converted to uranium tetrabromide. The heating was continued for 12 hours to complete the reaction. The cooling water was then drained from the reflux condenser and the residual bromine and sulfur bromide were distilled from the reaction mass. The sulfur present in the reaction mass was separated from the uranium tetrabromide by extraction with carbon tetrachloride. If desired, the uranium tetrabromide may be further purified by a step of fractional sublimation.

The sulfur bromide formed during the heating of the reaction mass is returned by the reflux condenser for reaction with the uranium dioxide. So far, it has not been proven that all of the bromine used in converting the dioxide to the tetrabromide is first formed into sulfur bromide, consequently the present invention is not to be limited by any theory of operation.

It will be appreciated that the previously described apparatus is only illustrative and that the success of the chemical reactions does not depend upon the exact arrangement described. The by-product, sulfur dioxide, may be absorbed in a medium other than sodium hydroxide, and cooling media other than water may be used in the condenser, as will be obvious to those skilled in the art. Heating means other than a sand bath operate quite satisfactorily.

The ratio of the reactants may be varied over relatively wide limits, it being only necessary to provide sufficient bromine to convert the uranium oxide at least substantially completely to the tetrabromide, and to provide sufficient sulfur to permit the formation of sulfur monobromide in situ. On the other hand, and if desired, sulfur monobromide that has been prepared previously in any suitable manner may be employed for the reaction with the uranium oxide, such as the dioxide, to produce the tetrabromide, by heating together these starting materials in a manner that may be generally similar to that already described.

Temperatures considerably above or below 170° C. may be employed, if desired, the use of higher temperatures being particularly feasible where the reaction is carried out under super-atmospheric pressure conditions. Temperatures in the range of about 60° to 220° C., with or without variation from substantially atmospheric pressure conditions, may be employed with satisfactory results. A preferred range of operation is about 140° to 190° C.

Although the conversion of the uranium dioxide or other oxide to the uranium tetrabromide may be carried out satisfactorily with fairly good-sized lumps of raw material, the operation seems to proceed more smoothly with the finely divided material, and experience indicates that the reaction may be controlled more satisfactorily with such material.

Many of the advantages of the present invention will be obvious. Particular attention is directed to the facts that the raw materials are readily obtainable in the desired physical form; that the reaction is carried out in a liquid phase; that the apparatus does not require any special fittings or complicated devices; that the operation is such that the close attention of an operator is not necessary; that no great harm is done if the heating of the reaction vessel is continued beyond the time when reaction has ceased; and that common materials such as glass are suitable for manufacturing the apparatus. In addition, purification of the desired product is accomplished in a simple, expedient and efficient manner.

Probably many apparently widely different embodiments of this invention may be made without departing from the principle, breadth and spirit thereof and it is to be understood, therefore, that this invention is not limited to the specific embodiments thereof except as encompassed in the claims.

What is claimed is:

1. In a liquid phase process for preparing uranium tetrabromide, the steps comprising refluxing a reaction mixture containing a uranium oxide, sulfur and bromine so that sulfur bromide is formed and sulfur dioxide is given off, continuing said refluxing until uranium tetrabromide is formed in the reaction mass and thereafter separating uranium tetrabromide from said reaction mass.

2. A process of preparing uranium tetrabromide which comprises refluxing a reaction mixture containing uranium dioxide, sulphur and bromine so that uranium tetrabromide is formed and sulphur dioxide is given off, distilling off by-product sulphur bromide and excess bromine from the reaction mass, extracting excess sulphur from the reaction mass by means of a solvent for sulphur, and separating the uranium tetrabromide from the extracted solution of sulphur obtained from the reaction mass.

3. In a liquid phase process for preparing uranium tetrabromide, the step comprising refluxing a mixture of a uranium oxide and sulfur bromide at a temperature in excess of the boiling temperature of sulfur bromide and not exceeding approximately 220 degrees C. for a period of time sufficient to form uranium tetrabromide, and thereafter separating uranium tetrabromide from the reaction mass.

4. The process according to claim 1 wherein the reaction is maintained at a temperature within the approximate range of 140 degrees C. to 190 degrees C.

5. The process according to claim 1 wherein the uranium oxide is uranium dioxide.

6. In a liquid phase process for preparing uranium tetrabromide the steps comprising heating a mixture of a uranium oxide, sulfur and bromine at a temperature in excess of the boiling temperature of sulfur bromide and not exceeding approximately 220 degrees C. and under refluxing conditions, whereby sulfur bromide is formed and vaporous sulfur bromide is condensed and returned to the reaction mass, said conditions being maintained for a period of time sufficient to form uranium tetrabromide, and thereafter separating uranium tetrabromide from the reaction mass.

7. In a liquid phase process for preparing uranium tetrabromide, the steps comprising refluxing a mixture of uranium dioxide and sulfur bromide at a temperature within the approximate range of 140 degrees C. to 190 degrees C., condensing and returning vaporous sulfur bromide to the reaction mass, said conditions being maintained for a period of time sufficient to form uranium tetrabromide, and thereafter separating the contaminants including sulfur bromide and sulfur from said uranium tetrabromide and recovering said uranium tetrabromide.

8. In a liquid phase process for preparing uranium tetrabromide, the steps comprising refluxing sulfur bromide and a uranium oxide at a temperature in excess of the boiling temperature of sulfur bromide and not exceeding approximately 220 degrees C. for a period of time sufficient to form uranium tetrabromide in the reaction mass, thereafter distilling contaminants including sulfur bromide from said reaction mass, extracting excess sulfur from the reaction mass by means of a solvent for sulfur and recovering uranium tetrabromide from the extracted solution thus obtained.

JAMES M. CARTER.

REFERENCES CITED

The following references are of record in the file of this patent:

Colani, "Annales de Chemie et de Physique:8, vol. 12, 1907, pages 74–75.